March 26, 1935.　　　V. DAHLMAN　　　1,995,378
AIR FILTER
Filed July 9, 1932　　　3 Sheets-Sheet 1

Inventor:
Verner Dahlman

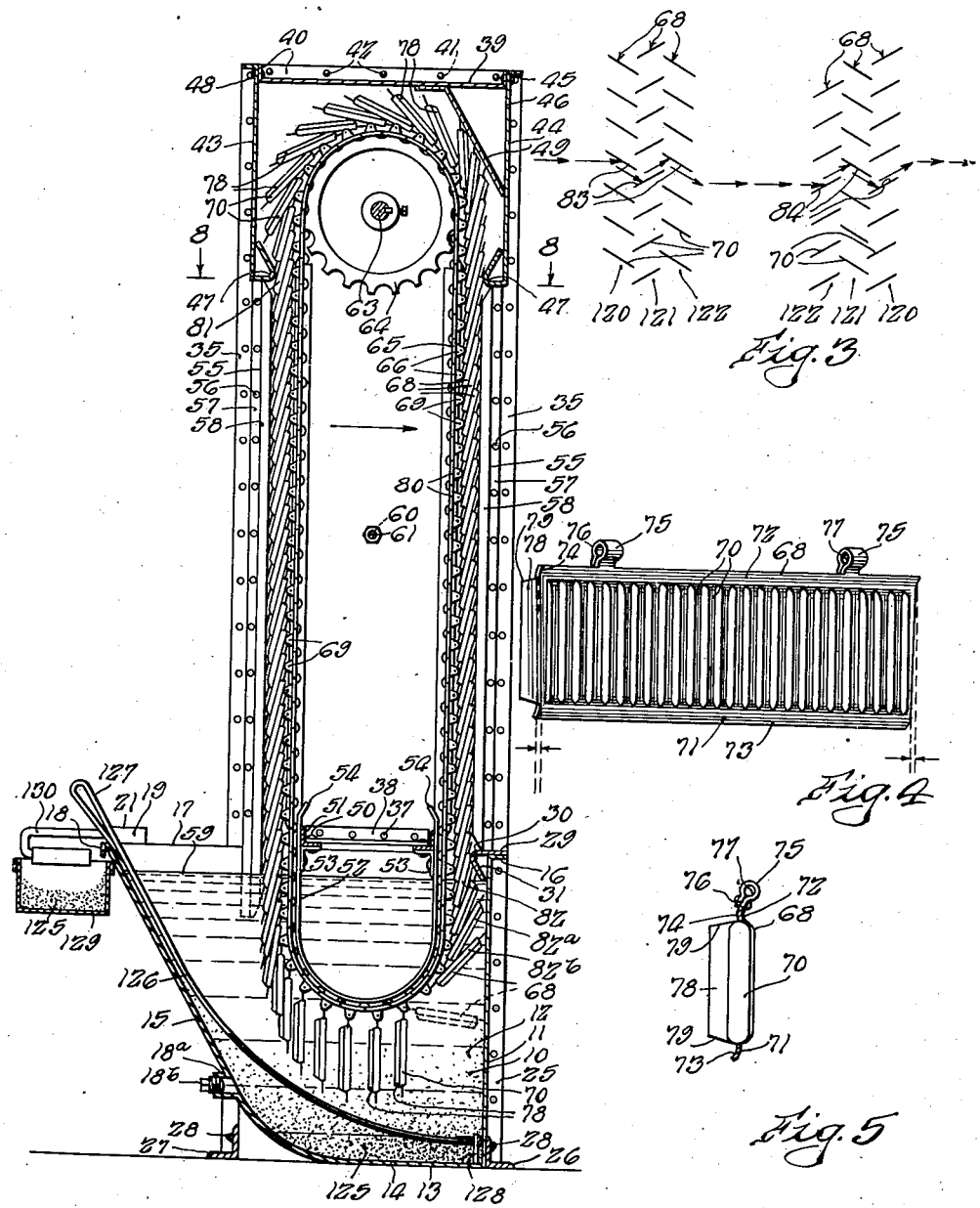

March 26, 1935.    V. DAHLMAN    1,995,378
AIR FILTER
Filed July 9, 1932    3 Sheets-Sheet 3
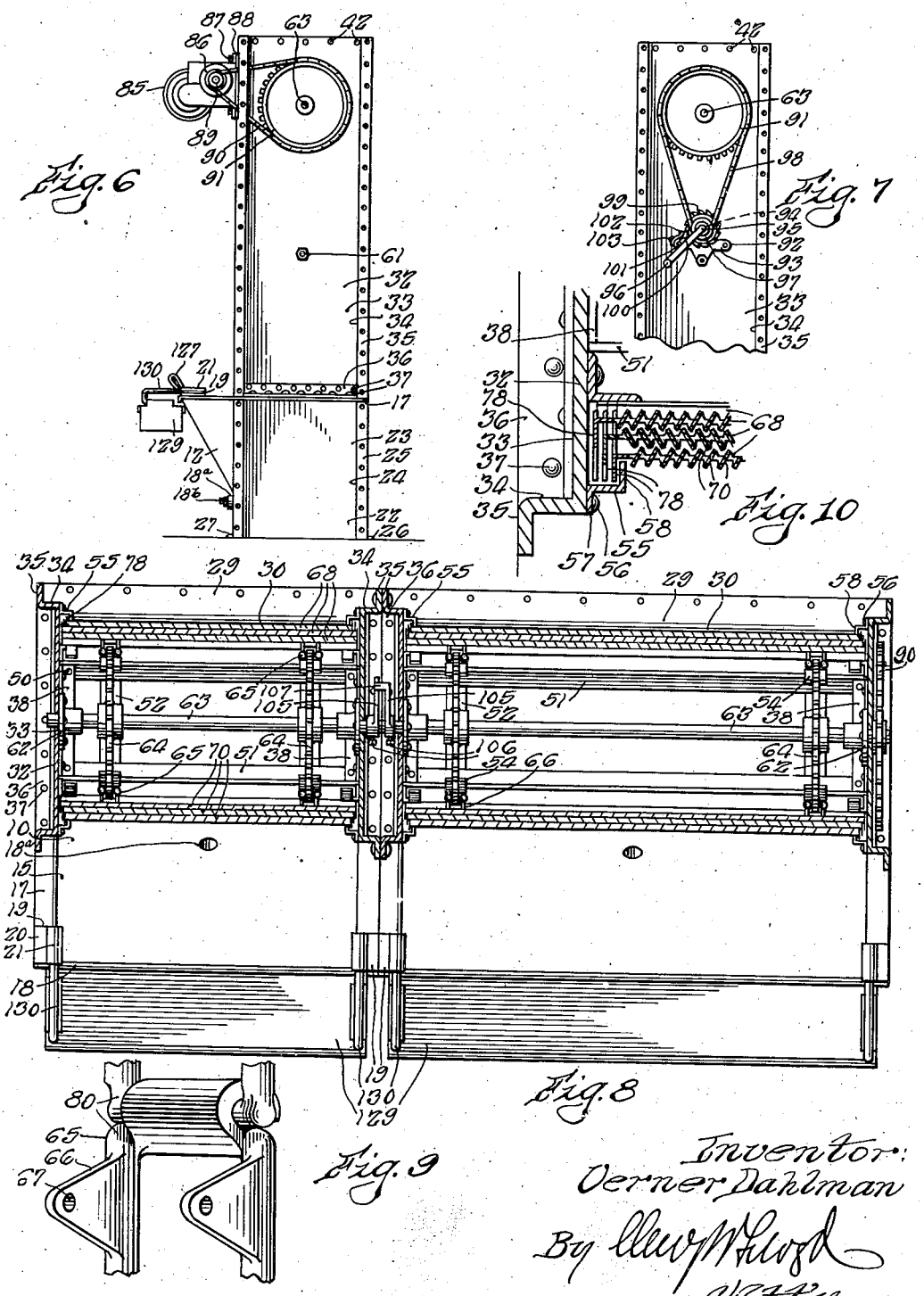
Inventor:
Verner Dahlman Patented Mar. 26, 1935

1,995,378

UNITED STATES PATENT OFFICE 1,995,378

AIR FILTER

Verner Dahlman, New Lenox, Ill., assignor to Independent Air Filter Company, Chicago, Ill., a corporation of Illinois Application July 9, 1932, Serial No. 621,717

3 Claims. (Cl. 183—52)

The present invention relates to a filter adapted to remove dust and other foreign particles from a current of air anterior to the ingress of such air into a selected space, and has to do more particularly with an improved type of filter providing means whereby automatic disposition of dust and foreign particles is had.

To the present time, many forms of air filters have provided but half satisfactory performance. The salient deficiencies have been directly accountable to the collection and retention of a vast amount of dirt upon the filter surface. Certain types of filters employ as a means of removing dust particles from the air, a series of complemental baffle plates against which the particles impinge to drop and lodge in a compartment removed from the entering air current. This method suffices to segregate the larger pieces of solid material and those having a relatively great specific gravity, but the more minute particles are conducted through the filter with the ventilating current.

Application of viscous material to the closely assembled louver plates is efficacious only until a lorication of dust is accumulated, when the efficiency of the device is decreased by the resultant clogging of the orifices. Furthermore, the outer crust of the collected matter eventually becomes hard and dry to defeat the purpose of the then covered adhesive material. The desired performance of this type of filter is had only by frequent disassembly and a thorough cleansing thereof before putting back into use.

Other forms of air filters, usually for small installations, use as a filtering means a material of resilient fibers sporadically arranged such as pads of cotton. As these pads become saturated with dust particles they are disposed of and replaced by new ones.

The objects of the present invention, in addition to including an improvement over rudimentary devices of the same character, among other things are:

To provide a device for removing dust particles from the air directed into a ventilating duct, and having a self-disposing means for the dirt collected thereby.

To provide an air filter having a plurality of filtering units pintled at an edge to a common conveying means in a manner to overlap, and disposed for conveyance through a bath of cleansing liquid.

To provide an air filter having a number of complemental filtering screens adapted to present first one face of integral imbrications to a blast of incoming air and then the opposite face to such blast of air.

To provide a plurality of filtering screens secured in an overlapping manner to a continuous conveying means to be placed transversely in an air duct that air passing therethrough necessarily passes through the filtering screens disposed on juxtaposed and oppositely moving sides of the conveying means to provide a double filtration of said air.

To provide in combination with a group of filtering screens pintled to a conveying means an oil bath through which the screens are effected to move at a greater rate of speed than that of the conveying means.

To provide an air filtering device embodying a means whereby riddance of collected dust may be had intermittently and at the termination of given periods dependent upon the rate of accumulation of the dust.

To provide an improved screen or plate for use in an oil filter.

To provide a plate for use in an air filter which has a more effective surface for the collection of dust particles.

To provide an air filter in which the dust collecting surface is of a material especially treated to become more efficacious in retaining a coating of viscous material and hence more effective for the gathering of dust particles.

These objects, and other desirable objects as will be disclosed in the description to follow, reside in the novel arrangement, unique combination, and improved construction of the elements embodying the invention and illustrated in the accompanying drawings hereby made a part of this specification, and in which:

Figure 2 is a cross section taken along the line 2—2 of Figure 1;

Figure 3 is a schematic diagram illustrating the course of a current of air through the device;

Figure 4 is a perspective view of a filtering screen as taken from the side;

Figure 5 is a second and end view of the screen shown in Figure 4;

Figure 6 is a side view of the present invention taken in elevation;

Figure 7 is a fragmentary side view of the invention showing details of a mechanism for hand operation thereof;

Figure 8 is a plan view of the invention taken from above;

Figure 9 is a fragmentary view of a filter screen chain of the invention showing detailed construction; and Figure 10 is a fragmentary horizontal section of the device illustrating in detail the seal between the filter curtain and a side panel.

Like reference characters are used to designate similar parts in the drawings and in the description which follows.

Figure 1:
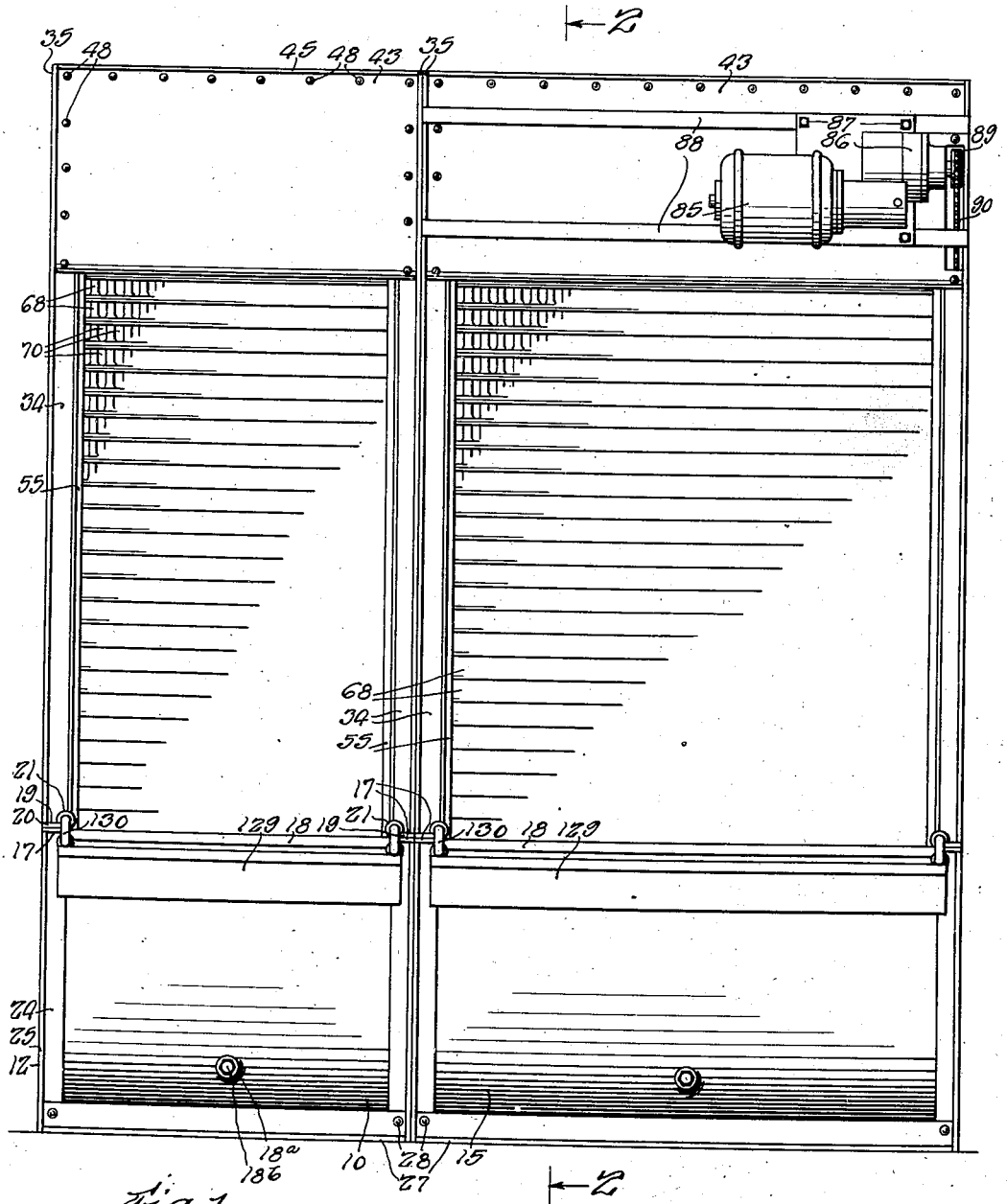
Figure 1 is an orthographic projection of an installation of the invention taken in elevation and from the front side.

The reference character 10 indicates a tank having vertical members in the form of a back 11, and opposed sides 12 articulated to extend forwardly from the back 12. Fabricated to the bottom edges of the vertical members 11 and 12 is a fourth member 13 comprising a horizontal bottom section 14, which carries forward into a gentle sloping formation to effect a front side 15; the lower and front edges of sides 12 having previously been stamped in a curved manner that the curvature had in the member 13 is readily conformable thereto. The joinders between the various parts of this tank to secure it in assembly are had by soldering or welding to render it leakproof. Narrow margins adjacent the top of sides 11 and 12 are bent outward the tank and compose horizontal flanges 16 and 17. A one hundred fifty degree outward articulation near the free edge of member 15 provides a downward projecting lip 18. A suitable drain 18a with a plug 18b may be supplied to the tank.

Borne upon the extreme forward end of flanges 17 are sleeve brackets 19. Each bracket 19 is formed from a flat sheet of material to present a base 20 to rest upon flange 17 and a truly circular bearing 21, the latter being positioned in a plane mutual to the side 12. Any standard means as riveting or welding may secure the brackets to the flanges 17.

Enclosing the two vertical and oppositely disposed sides 12 of the tank or reservoir 10 are channel shaped pieces 22 which form a part of a superstructure for the reservoir, and a foundation for the upper section of the device subsequently described. The channels 22 comprise a central web 23, vertical side section 24 normal thereto, and oppositely directed flanges 25 parallel to the web 23 but offset therefrom by the width of section 24. The length of the channel members 22 is such as to coincide with the height of the tank 10 so that the upper edge bears against the under side of flanges 17. Assembly of the channel 22 with the tank 10 is retained by a plurality of spot welds or the like between the web 23 and the tank. Further rigidity is provided for the base structure by angle pieces 26 and 27 resting upon the floor and secured to the side sections 24 of opposed channels 22 by means 28.

To the upper face of flange 16 is welded horizontal air seal 29, an acute angle member with the apex 30 therein coextensive with the linear measure and of a rounded nature. The apex 30 is inwardly disposed of the tank a sufficient distance that the depending edge 31 does not normally bear against the wall 11.

Rising vertically from either side of the superstructure surrounding the tank 10 are side members 32. These members 32 have a horizontal cross section exactly congruent to that of channels 22 and of which they are a practical extension thereof. The central portion of the channels 32 comprises a web 33 mounted on either side by a section 34 normal thereto, which latter section extends to be bent at ninety degrees to form flanges 35. To the bottom of the side 32 and intermediate normal sections 34 is secured an angle brace 36 with the lower edge flush with the lower edge of the web 33 and extending horizontally so as to position the front edge flush with the flanges 35.

Rivets or bolts 37 are positioned in apertures in the web 33 and other apertures registering therewith in angle brace 36 and a second angle member 38 on the inside of the side member 32. In this manner the angle from 38 is fixed exactly central to the lateral edges of the side 32.

The horizontal element of angle brace 36 is seated upon the flange 17 bordering the top of the reservoir or tank 10. Hence any standard means, as rivets or bolts, may be inserted in opposed apertures in these two adjoining flange members, and it is in this manner that the upper structure is held in assembly with the lower structure already described.

Suspended between the two side members 32 and at their top edge is a top plate 39. This plate is in the form of a rectangular pan having side walls 40 circumscribing the edge which may be integral to the main body of the top and be struck up therefrom. Apertures 41 are spaced within all flanges 40 of the top plate, and those in the end flanges register with like apertures in the top of the side members 32 and have in common with said registering apertures pins or bolts 42 whereby fabrication is had.

Pending from the side walls 40 at the front and back side of the top plate 39 are respectively front and back members 43 and 44. These members are identical and comprise at their top edge a flange 45 normal to the main body 46 flush with the top of side members 32 and the top of side walls 40. The lower edge of the panel members are articulated inwardly at an angle of ninety degrees to extend a short distance before being struck upwardly and inwardly in a curved manner to form a shoulder 47 inverted to extend to a point normally slightly away from the main body 46. The panel members 43 and 44 are secured to flanges 40 of the top plate 39 by means 48 as well as to the sections 34 of sides 32 by similar means.

Somewhat to the rear of the longitudinal center line of the top may be anchored one end of a strap 49. This strap extends downwardly and rearwardly until it makes a sliding contact with the rear panel 44, for a purpose to be explained more in detail later. The anchorage of the strap 49 is preferably in the form of spot weld. Other means may be employed.

Extending between the ends of angle supports 38 and held by means of rivets 40 are angle stringers 51. These stringers 51 provide a means whereby lower screen guides 52 may be suspended. Said guides are fastened to the stringers 51 with the aid of short angle brackets 53. The lower screen guides are substantially of a U-shape and have the extreme upper ends 54 thereof disposed angularly inwardly.

Adjacent the front and back edges of webs 33 in the side members 32 are placed vertical air seal strips 55 to be held in place by bolts 56. A section 57 of the strips 55 lies contiguous to the web 33. It is bent normally along its inner edge to extend and be again bent at ninety degrees inwardly to form a flange 58 offset from the base section 57 by the distance of the intervening articulated section.

It will be noted that strips 55 are of a length to reach from a point in contact with the shoulder 47 to a position well below the oil level 59 in the reservoir 10.

Centrally located with respect to side members 32 are apertures 60 which provide an engaging means for a tie rod 61 extending between the two walls 32. A nut on either side of each wall 32 and engaging threads of a rod 61 prevents any lateral movement of the walls. Carried well up in the side members 32 within suitable bearings 62 is a main operating shaft 63. Keyed to the shaft 63 are sprocket wheels 64. These wheels 64 are spaced a short distance from either side 32 and carry thereon a chain 65. The chain 65 depends from the sprockets 64 to encircle the lower screen guide members 52, and are free to operate in frictional contact with the guide members. The opposed sides of each chain link have projecting outward therefrom lugs 66 having bearings 67. Between each pair of lugs 66 is inserted a complemental lug 75 extending from an edge of a filtering screen 68, and which contains an aperture to aline with similar apertures in the lugs 66. The alined apertures contain a pintle member 69.

Reference will now be had to Figures 4 and 5 showing a filtering screen or filter plate in detail. Each screen is stamped from a single sheet of thin sheet material. During the stamping operation, a series of long and comparatively narrow parallel portions of the plate are turned outwardly from the body of the plate to form louvered openings through which the air passes. The vertical and parallel imbrications or louvers 70 formed by this operation are arranged in the slanted position shown to deflect the air as it passes through the plate. It will be noted that the lower side 71 of the screen 68 is slightly shorter than the upper side 72 as illustrated in Figure 5. In order to prevent or retard the sweeping of oil from the plates into the air stream, the lower edge 71 of each plate contains a slightly outwardly curved section 73 while the upper edge 72 contains a curved section 74 disposing the upper edge oppositely to the lower edge. In this manner, the lowermost edge presented by the plates, in either up or down travel, is made to curve toward the incoming air. Consequently, when oil drains to the edge of a plate which is moving into the air stream, the oil droplets will not be swept from the plate, but, by virtue of the edge curvature, will be forced from the edge back onto and along the curved section of the plate.

The surface on both sides of each filtering screen is scored or roughened, the utility of which is to provide more surface for holding oil upon being drawn from the oil bath. Such abrased sides in addition to exposing a greater surface for the oil to adhere to, provide a surface tending to impede the gravitational flow of the oil therefrom.

Symmetrically placed upon the upper edge 72 of each screen 68 are lugs 75 having opposed leaves 76 and a bearing section 77. The opposed leaves 76 envelope the edge 72 in a permanent manner as by means of a rivet, or a spot weld. At the ends of the screen 68 are struck up flanges 78 which have tapered ends 79.

Each link 80 of the chain 65 has a lug 66 integral therewith. Clip 75 engages the lug 66 to pivotally support the screen and is secured thereto by any suitable fastening device. Since, however, the height of each screen is greater than the length of each link there will be an overlapping of said screens. The screens 68 are made of a height three times the length of each chain link so that the consecutively secured screens will form a uniform wall equal in thickness to that of three screens. The lower edge of each screen 69 is made narrower or of a shorter length than the top edge so that when the screens overlap one another the lower edge of the succeeding screen will be accommodated between the flanges of the preceding screen without binding.

It will be noted at this time that half of the number of screen panels 68 attached to the chain 65 are imbricated so that the imbrications slant to the right relative to the direction of air thereon, while the remaining number of screens will deflect the air in the opposite direction, or the left. The panels 68 are attached to the chain in such a manner that those having a deflection of the incoming air in one direction alternate with those deflecting the air oppositely. Therefore, air passing through a wall comprising a thickness of three panels arranged as above described will be deflected in the manner shown in Figure 3. Here it is seen that the air striking the outermost panel 120 is deflected at approximately thirty degrees to strike the next inward panel 121 which as noted before directs the flow of air in the opposite direction. Upon leaving the second mentioned panel the air engages the third panel 122 whose louvers are deflected in the same direction as the first mentioned panel.

In order that the small granules of dirt are efficaciously stopped as an incident to the passing of the air between the louver panels, it is essential that the louvers be coated with the oil or viscous solution. The principle of this invention depends upon the foreign matter in the air adhering to the imbricated walls and not upon such matter being stopped to drop downwardly from the force of gravity. It is for this reason that the angular walls of the apertures in the screens are roughened to carry and retain a coating of oil.

As the attenuated air currents progressively pass through the screens, and are there sharply deflected, the mass of the dust particles carried thereby accumulate a kinetic energy to carry them in straight lines to strike the deflection panels. Once in contact with the panels or louvers the dust particles will be retained by the oil. The panels are definitely arranged in the manner above depicted so that the air currents are deflected quickly without materially decreasing the velocity of said currents.

When this air filtering device is in operation it is placed within the entrance of an air duct rectangular in cross section to conform to the faces provided by the top and bottom and right and left sides of the device. That is, the device sets upon the bottom of the entrance to the duct. Flanges 35 of side members 32 are positioned adjacent to the side walls of the duct while the flanges 44 of the panel members 43 engage the top wall of the duct. Hence it is obvious that all air ingressing into the duct must first pass into the filtering device by way of the opening bounded by the vertical air seal strips 55, the lower edge of the front panel 43 and the oil level 59. Likewise egress of the air from the filtering device must necessarily be had through the opening bounded by the rear strips 55 and the bottom edge of the rear panel 44 and horizontal air seal member 29. It is therefore obvious that all air thus passing into the duct must transgress the imbricated walls formed of the screen panels and presented at both the front and back sides of the device. Leakage of air between the ends of the filter panels 68 and the sides 32 is prevented by the contact of flanges 78 with the inner surface of the flange 58 of the strips 55. The escape of air around the filter walls from above is prevented by the engagement of the outer and lower edge of a panel member 81 at the top of the front opening engaging the shoulder 47 presented inwardly of the lower edge of panel member 43. The lower edge of the front opening is efficaciously sealed by the oil level 59 of the oil in tank 10.

The back opening of the device is sealed in an identical manner by shoulder 47 and strips 55. In addition to the above mentioned shoulder and strips the horizontal seal member 29 is employed to engage the uppermost edge of a panel screen 82.

As the air passes through the two walls comprising a plurality of thicknesses of filter members it will be noted that in passing through the front wall the air strikes sides 83 of the imbricated members and upon further projection to pass through the back side or wall the opposite side 84 of the imbricated members is struck. Therefore, by rotation of the main drive shaft 63 and the sprocket 64 the chain 65 is made to reverse itself and present the panel members formerly on the front side to the back side where a clean surface will be exposed to the air blast. It is the purpose of the strap 49 to come in contact and impinge somewhat against the free ends of the pintled screen members as they are rotated about the sprocket 64 so that said members will not toggle and strike the rear panel 44, and to properly guide them into position for the subsequent downward movement. The depending edge 31 from the horizontal seal 29 provides a camming surface to the upper edge of the panel screen 82 as it is carried downward and allows said edge to fall gently against the back side of the tank 10 as a downward movement is imparted thereto. A further movement of the panel 82 brings it into a horizontal position such as 84 whereupon a slightly continued movement of the chain 65 will cause said panel 84 to swing within the ears 66 to move rather rapidly through the oil bath and wash some of the collected dust from the interstices thereon.

As a prime mover for the device a small electric motor 85 may be provided, Figures 6 and 8. This motor 85 along with a speed reducing gear train device 86 may be supported to the front panel 43 by means of bolts 87 coengaging reinforcing members 88. To the end of the gear reduction mechanism may be a sprocket 89 to which is engaged a roller chain 90 to also engage and drive a sprocket wheel 91 disposed upon the extreme right end of the main drive shaft 63, and without the side member 32. It is not intended that the chain 65 be continually in motion but on the contrary that it be moved infrequently depending upon the amount of dust within the air. Experimentation with the device has proved that by allowing the screens to stand for a sufficient period within the oil wash will allow the dust particles to become saturated with oil and thereby slide from the screens without necessity of any turbulation of the oil or movement of the screens. Hence when movement of the chain is had only such movement is provided to remove the screens then in the oil into a front position on the chain. For instance, if the height of the air passageway through the device was such that the amount of panels required to fill it were twice the number of panels submerged in the oil bath, two successive adjustments of the screens would be had intermediate the adjustment which would bring the screens submerged at the present into a second submerged position.

In places where it would not be practical to operate the screens by hand, an automatic clock control may be installed to control the electric motor.

Reference to Fig. 7 shows a system whereby hand operation of the device may be had. Directly beneath the sprocket 64 and on the web 23 of the right channel 22 is a bracket casting 92. Attachment of the casting 92 to the web 23 is had by rivets extending through apertures in the legs 93 of the bracket and into the web 23. The upper part of the bracket casting provides a bearing 94 in which is rotatively mounted a shank 95 of a crank 96. Mounted upon the crank 96 and in alinement with the sprocket 91 is a second sprocket 97, connected to the sprocket 91 by means of a roller chain 98. Juxtaposed on the crank 96 to the sprocket 97 is a ratchet wheel 99 which engages a pawl 100 pivoted to the bracket 92 by means of a pin 101. Connected to the pawl between its pivotal point and the operative end thereof is a small contraction spring 102 with the opposite end anchored by a suitable means 103 to the bracket 92. This ratchet and pawl arrangement prevents a turning of the crank in an anti-clockwise direction to transmit to the chain 65 a likewise anti-clockwise locomotion to result in the jamming of screens 82a and 82b against the horizontal seal member 29 and to possibly damage them.

When it is desired to have separate and independent air ducts emerge from a building at the same point it is possible to install two or more of these devices side by side as illustrated in Figures 1 and 8. By aligning the adjacent side walls of these separate devices the operating shafts are also brought into direct alinement. When such a method is employed, coupling means is provided between the two shafts in the form of cantilevers 105. A lever 105 is fixedly attached to the end of either shaft by means of a set screw 106 extending through the shank thereof. Upon the outer end of each lever is a lug 107 which engages the similar lug 107 on the complemental lever when rotation of the first lever is had.

After the air filter has been in use for some time, the dust particles sliding from the submerged screen panels form a sludge 125 at the bottom of the tank 10. Removal of this sludge is had by means of an implement 126 having a long curved handle 127 and a broad transverse blade 128 not unlike that of a hoe. The sludge is dragged upwardly along the front and curved side of the tank ahead of the hoe blade by manipulation of the handle 127. The sludge is conveyed in this manner over the brink of the front side on into a suitable receptacle 129. The receptacle 129 is conterminate to the width of the tank 10. Brackets 130 (which telescope into the bearings 21) are provided at each end of the receptacle for its support.

Having thus described my invention, what I claim as new and desire to secure by Letters Patent in the United States, is:

1. An air filter comprising an endless conveyor arranged vertically for upward and downward movement through a stream of air, and a series of flat plates traversing such stream and pivoted at one edge to said conveyor, each plate being louvered, the louvers in successive plates being opposed in direction, and contiguous plates overlapping to provide a tortuous path for the stream of air.

2. An air filter having a number of flat filter plates, each plate having a series of long, narrow parallel portions which are stamped from the body of the plate to a slanted position to form louvered openings through which the air passes and in which it is deflected, said plates being arranged one after another so that incoming air is caused to pass successively through a number of plates, and to be deflected successively in different directions by said plates.

3. An air filter comprising an endless, vertically arranged series of filter plates which overlap each other to build up a uniform filtering thickness, said plates having oppositely curved upper and lower marginal edges and air filter openings therebetween, the lower edge being curved toward the incoming air.

VERNER DAHLMAN.